US012680000B2

(12) United States Patent
   Quaderer

(10) Patent No.: US 12,680,000 B2
(45) Date of Patent: Jul. 14, 2026

(54) SEAL COATED DEVICES

(71) Applicant: Zephyros, Inc., Romeo, MI (US)

(72) Inventor: Dean Quaderer, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 18/411,472

(22) Filed: Jan. 12, 2024

(65) Prior Publication Data

US 2024/0150618 A1     May 9, 2024

Related U.S. Application Data

(63) Continuation of application No. 16/629,229, filed as application No. PCT/US2018/043241 on Jul. 23, 2018, now Pat. No. 11,873,427.

(60) Provisional application No. 62/535,441, filed on Jul. 21, 2017.

(51) Int. Cl.

| | |
|---|---|
| *C09J 5/08* | (2006.01) |
| *B60R 13/02* | (2006.01) |
| *B60R 13/08* | (2006.01) |
| *B62D 27/02* | (2006.01) |
| *B62D 33/04* | (2006.01) |
| *C09J 11/04* | (2006.01) |
| *C09J 11/06* | (2006.01) |
| *C09J 11/08* | (2006.01) |
| *C09J 133/04* | (2006.01) |
| *E04B 1/61* | (2006.01) |
| *E04B 1/76* | (2006.01) |
| *E04C 2/20* | (2006.01) |
| *F16B 13/14* | (2006.01) |
| *F16B 15/00* | (2006.01) |

(52) U.S. Cl.
   CPC ............ *C09J 5/08* (2013.01); *B60R 13/0206* (2013.01); *B62D 27/026* (2013.01); *B62D 33/046* (2013.01); *C09J 11/04* (2013.01); *C09J 11/06* (2013.01); *C09J 11/08* (2013.01); *C09J 133/04* (2013.01); *E04B 1/6129* (2013.01); *E04B 1/7629* (2013.01); *E04C 2/205* (2013.01); *F16B 13/141* (2013.01); *F16B 15/0092* (2013.01); *B60R 2013/0807* (2013.01); *C09J 2423/16* (2013.01); *C09J 2433/00* (2013.01); *C09J 2463/00* (2013.01); *C09J 2491/00* (2013.01)

(58) Field of Classification Search
   CPC ... E04B 1/6129; E04B 1/7629; B62D 27/026; B62D 33/046; B29K 2105/04; B60R 2013/0807; B60R 13/0206; B29C 66/727;
   F16B 13/141; F16B 39/225; F16B 2019/045; F16B 15/0092; C08K 7/22; C09J 2491/00; C09J 2423/16; C09J 2463/00; C09J 133/04; C09J 2433/00; C09J 11/04; C09J 11/06; C09J 11/08; C09J 5/08
   See application file for complete search history.

(56) References Cited

U.S. PATENT DOCUMENTS

| | | | |
|---|---|---|---|
| 4,451,583 A | 5/1984 | Chesler | |
| 11,873,427 B2 * | 1/2024 | Quaderer | ................... C09J 5/08 |
| 2004/0062903 A1 | 4/2004 | Evans | |
| 2004/0143969 A1 | 7/2004 | Czaplicki | |
| 2004/0221953 A1 | 11/2004 | Czaplicki | |
| 2007/0284036 A1 | 12/2007 | Sheasley | |
| 2008/0105992 A1 | 5/2008 | Walker | |
| 2008/0265516 A1 | 10/2008 | Walker et al. | |
| 2016/0185079 A1 | 6/2016 | Baldwin | |

FOREIGN PATENT DOCUMENTS

| | | | |
|---|---|---|---|
| EP | 1 921 121 A1 | 5/2008 |
| JP | 2007526160 A | 9/2007 |
| JP | 2010059438 A | 3/2010 |
| WO | 9630180 A1 | 10/1996 |
| WO | 2005/002950 A2 | 1/2005 |
| WO | 2008/014053 A2 | 1/2008 |

OTHER PUBLICATIONS

PCT International Search Report & Written Opinion dated Oct. 11, 2018, Application No. PCT/US2018/043241.
Chinese First Office Action dated Jul. 21, 2021, Application No. 20188048888.2.
Brazil Office Action dated Jun. 28, 2022, Application No. 112020001202-5.
India First Examination Report Dated Sep. 29, 2021, Application No. 202037001504.
European First Communication Pursuant to Art. 94(3) EPC, Application No. 18759191.2, dated Jan. 24, 2022.

* cited by examiner

*Primary Examiner* — Scott R. Walshon
(74) *Attorney, Agent, or Firm* — The Dobrusin Law Firm, P.C.

(57) ABSTRACT

An activatable material coated device comprising a device and an activatable material, comprising at least about 5.5% or greater blowing agent, blowing agent accelerator or both. The activatable material is milled into a particulate size of from about 500 microns to about 10000 microns and the device is heated to a temperature of at least about 30° C. but below an activation temperature of the activatable material and contacted with the particulate of the activatable material, adhering the activatable material to the device.

19 Claims, No Drawings

SEAL COATED DEVICES

FIELD OF THE INVENTION

The present teachings relate generally to fastening, reinforcing and baffling devices in combination with an activatable material. More specifically, the present teachings address fastening, reinforcing and baffling devices coated in an activatable material that exhibits a property such as expansion and sealing upon a preselected activating condition.

BACKGROUND OF THE INVENTION

Fastening, reinforcing and baffling devices are commonly utilized in the transportation and construction industries for a variety of purposes. Such devices may be self-locking (e.g. self-securing, self-attaching, self-sealing). The self-locking nature of the devices may be a result of an adhesive coating applied to a portion of or substantially all of the device.

In many instances, fasteners pass through an aperture or a reinforcing or baffling device may be located into a cavity. When these devices are placed into the aperture or cavity, there may be a space between the device and the cavity or aperture. This space may allow for fluids and gasses to pass through the aperture or cavity. Applying an activatable adhesive (e.g., a foaming or expanding adhesive) to the devices (which may be activated to expand under predetermined conditions) allows this space to be filled, which may assist in preventing the flow of fluids and gases from passing through the aperture and past the fastener.

Expanding adhesive coatings that are activated by the mechanical energy released in the action of applying the coating to a fastener (e.g., expandable adhesives that expand immediately upon application to the fastener) are known in the art. However, these fasteners do not allow for subsequent coatings utilized in the manufacturing process, such as an electrocoating, to be applied to the aperture surface once the fastener has been inserted, but prior to any activation of the adhesive.

Thus, it is desirable to provide a coated fastening, reinforcing or baffling device with an activatable adhesive which, upon selective activation, expands and seals the device within an aperture or cavity, preventing fluids or gasses from passing through the aperture or cavity. It is desirable to provide a coating that can be easily and quickly applied and is adapted for selective activation such that after the device has been located, additional coating and/or other manufacturing procedures can occur prior to activation. As an example, a coating may be sprayed, dipped or otherwise applied to a device or to a surface which receives the device. Thus, devices or surfaces that may receive the coating may be substantially covered by the adhesive post-expansion.

SUMMARY OF THE INVENTION

It is one object of the present teachings to provide a selectively activatable expandable material coating. It is another object of the present teachings to provide a fastening, reinforcing or baffling device having a selectively activatable material coating adhered The teachings herein are directed to an activatable material coated device comprising a device for fastening, baffling, sealing, or reinforcing and an activatable material. The activatable material comprises at least about 5.5% or greater blowing agent, blowing agent accelerator or both, a curing agent; and one or more fillers or reinforcing components.

The activatable material is milled into a particulate size of from about 500 microns to about 10,000 microns. The device is heated to a temperature of at least about 30° C. but below an activation temperature of the activatable material and contacted with the particulate of the activatable material, adhering the activatable material to the device.

The activatable material may further comprise a dispersant having a molecular weight of less than about 50,000 amu. The dispersant may be selected from a paraffin wax or an EPDM (Ethylene Propylene Diene Monomer). Upon exposure to an elevated temperature, the activatable material may expand to at least 100%, at least 500%, at least 1000% or even at least 3000% of its original size. The one or more fillers or reinforcing components may include one or more of calcium carbonate, aramid pulp, or combinations thereof.

The activatable material may include about 10% to about 70% by weight of a polymeric admixture, the polymeric admixture including one or more acrylates and one or more acetates. The polymeric admixture my comprise at least about 40% of the activatable material and the one or more acrylates may comprise about 40% to about 85% of the polymeric admixture and the one or more acetates may comprise about 15% to about 15% of the polymeric admixture.

The polymeric admixture may include about 6.0% to about 20% tackifier, the tackifier being a hydrocarbon resin, and about 0.1% to about 10% by weight epoxy resin. The activatable material may include 8% or greater blowing agent and blowing agent accelerator, the blowing agent being selected from an amine or amide and the blowing agent accelerator being selected from a metal salt or an oxide.

The activatable material is a frozen material prior to being milled. Upon exposure to an elevated temperature greater than about 180° C., the activatable material expands to a volume that is at least 2000% greater than the volume of the activatable material in an unexpanded (e.g., green) state. The activatable material may further comprise a curing agent having an activation temperature between about 60° C. and about 110° C.

The activatable material may be in a pellet form prior to being milled. The activatable material may be in a pellet form prior to being milled. The activatable material may be first pelletized and frozen thereafter.

The teachings herein further provide for a method for producing an activatable material coated device. The method includes providing a device, pelletizing an activatable material, optionally freezing the activatable material, milling the activatable material to a particulate having an average size of from about 500 microns to about 10,000 microns, heating the device to a temperature of at least about 30° C. but below an activation temperature of the activatable material; and contacting the device with the milled activatable material thereby adhering the activatable material to the device. The activatable material comprises at least about 5.5% by weight or greater blowing agent, blowing agent accelerator or both.

The milling step may be accomplished by freezing the activatable material and grinding the frozen activatable material. The milling step may be accomplished by grinding the activatable material to a desired size and then freezing the particulate. The activatable material may be milled to a first particle size, and then further milled to a second desired particle size from about 500 microns to about 10,000 microns. Freezing the activatable material may occur after the activatable material has been milled to a first particle size, but before being milled to a second desired particle size.

The activatable material coated device may secure two or more structures together that are exposed to a temperature of at least about 180° C., causing the activatable material to expand at least about 500%, filling and sealing where the two or more structures meet. After the activatable material coated device secures two or more structures together, subsequent coatings may be applied to the two or more structures such that the subsequent coatings cover the structures, including one or more through holes which the material coated device passes through.

The method may include installing a device into an aperture or cavity after contacting the device with the milled activatable material. The method may include installing a device into an aperture or cavity before contacting the device with the milled activatable material. The method may include storing a resulting coating device for at least 30 days prior to installing the device.

The activatable material may exhibit characteristics such as low weight, good adhesion, sound absorption, sound damping, relatively high levels of expansion, homogeneous expansion, consistent or predictable expansion or other desired characteristics. The activatable material may exhibit a relatively high level of expansion without sacrificing characteristics such as adhesion, homogeneity of expansion or the like. Coating a portion of or substantially all of a device with the activatable material provides for sealing and securing the device within an aperture or cavity after a selectable condition is presented to activate the adhesive such that prior to the activation, other manufacturing processes and/or coatings can be applied to the article that the device is located within.

DETAILED DESCRIPTION OF THE
INVENTION

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description. Percentages herein refer to weight percent, unless otherwise indicated.

This application claims the benefit of the filing date of U.S. Provisional Application Ser. No. 62/535,441 filed on Jul. 21, 2017, the contents of that application being hereby incorporated by reference herein for all purposes.

The present teachings are predicated upon providing a particulated activatable material coating, and articles incorporating the same. The particulated activatable material forms a coating that preferably expands upon activation by one or more of exposure to heat, moisture, pressure, electromagnetic induction, ultra violet light, or some other stimulus. It is also possible that the activatable material may activate upon contact with a chemical stimulus. Surprisingly, even though the material is particulated prior to forming the coating, the activatable material can exhibit relatively high levels of expansion while maintaining homogeneity of expansion and/or without experiencing cohesive failure. Additionally, it has been found that the activatable material coated device is particularly useful in applications such as providing sound absorption, baffling or sealing to articles of manufacture in the automotive, marine, construction and aerospace industries.

In a typical application, the activatable material can assist in providing, baffling, adhesion, sealing, acoustical damping properties, reinforcement or a combination thereof within a cavity of or upon a surface of a structure, or to one or more members (e.g., a body panel or structural member) of an article of manufacture.

The activatable material of the present teachings may be applied to various articles of manufacture for providing acoustical damping to the articles, for sealing the articles or for providing reinforcement to the articles. Examples of such articles of manufacture include, without limitation, household or industrial appliances, furniture, storage containers, buildings, sporting equipment, structures or the like. It is possible that the activatable material coated devices are applied to portions of an automotive vehicle such as body or frame members (e.g., a vehicle frame rail) of the automotive vehicle. One method of the present invention contemplates applying the activatable material to a device in an unexpanded state and activating the material for expanding it to a volume greater than its volume in the unexpanded state (e.g., 100% greater, 200% greater, 500% greater, 1000% greater, 2500% greater, 3000% greater or higher).

Percentages herein refer to weight percent, unless otherwise indicated. The activatable material typically includes a polymeric material. Such polymeric material may comprise a polymeric admixture, which may include a variety of different polymers, such as thermoplastics, elastomers, plastomers combinations thereof or the like. For example, and without limitation, polymers that might be appropriately incorporated into the polymeric material include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terephthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyamide, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, polymethacrylate.

The polymeric material typically comprises a substantial portion of the activatable material (e.g., up to 85% by weight or greater). Preferably, the polymeric material may comprise about 15% to about 85%, more preferably about 20% to about 70% or even more preferably about 30% to about 65% by weight of the activatable material.

It is possible that the polymeric material includes one or more acrylates. The acrylates may include, for example, simple acrylate, methyl acrylate, ethyl acrylate, butyl acrylate, vinyl acrylate, copolymers or combinations thereof or the like. Moreover, any of these acrylates may include other chemical groups such as epoxy, ethylene, butylene, pentene or the like for forming compounds such as ethylene acrylate, ethylene methyl acrylate and so on, and additionally for forming copolymers or combinations thereof or the like.

When included, the one or more acrylates typically comprise about 10% or less to about 95% or greater, more preferably about 20% to about 85% and even more preferably about 35% to about 75% by weight of the polymeric admixture.

A preferred acrylate is a copolymer of butyl acrylate and methyl acrylate and more particularly a copolymer of an ethylene butyl acrylate and ethylene methyl acrylate. An example of such a copolymer is sold under the tradename LOTRYL 35BA40. Another preferred acrylate is an epoxy modified (e.g., epoxidized) acrylate copolymer. An example of such a copolymer is sold under the tradename ELVALOY 4170.

It is also possible that the polymeric admixture includes one or more acetates. The acetates may include, for example, acetate, methyl acetate, ethyl acetate, butyl acetate, vinyl acetate, copolymers or combinations thereof or the like. Moreover, any of these acetates may include other chemical groups such as epoxy, ethylene, butylene, pentene or the like for forming compounds such as ethylene acrylate, ethylene methyl acrylate and so on and additionally for forming copolymers or combinations thereof or the like. When included, the one or more acetates typically comprise about 5% or less to about 50% or greater, more preferably about 7% to about 35% and even more preferably about 15% to about 25% by weight of the polymeric admixture.

A preferred acetate is ethylene vinyl acetate (EVA). One example of such an acetate is a relatively high ethylene content EVA sold under the tradename ESCORENE UL-7760. Another example of such an acetate is a relatively low molecular weight/low melt index EVA sold under the tradename ESCORENE UL-MV02514.

The activatable material may include an epoxy resin component. Epoxy resin is used herein to mean any of the conventional dimeric, oligomeric or polymeric epoxy materials containing at least one epoxy functional group. The polymer-based materials may be epoxy containing materials having one or more oxirane rings polymerizable by a ring opening reaction. In preferred embodiments, the activatable material includes up to about 20% of an epoxy resin. More preferably, the activatable includes between about 0.1% and 50% by weight epoxy resin. The epoxy may be aliphatic, cycloaliphatic, aromatic or the like. The epoxy may be supplied as a solid (e.g., as pellets, chunks, pieces or the like) or a liquid (e.g., an epoxy resin). The epoxy may include an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Preferably, an epoxy resin is added to the activatable material to increase properties such as adhesion, cohesion or the like of the material. Additionally, the epoxy resin may strengthen cell structure when the activatable material is a foamable material. One exemplary epoxy resin may be a phenolic resin, which may be a novalac type or other type resin. Other preferred epoxy containing materials may include a bisphenol-A epichlorohydrin ether polymer, or a bisphenol-A epoxy resin which may be modified with butadiene or another polymeric additive.

A variety of tackifiers or tackifying agents may be included in the activatable material. Exemplary tackifiers include, without limitation, resins, phenolic resins (e.g., thermoplastic phenolic resins), aromatic resins, synthetic rubbers, alcohols or the like. According to one preferred embodiment, a hydrocarbon resin 9 (e.g., a C5 resin, a C9 resin, a combination thereof or the like) is employed as a tackifier. The hydrocarbon resin may be saturated, unsaturated or partially unsaturated (i.e., have 1, 2, 3 or more degrees of unsaturation). One example of a preferred hydrocarbon resin is a coumarone-indene resin. Another example of a preferred hydrocarbon resin is sold under the tradename NORSELENE® S-105. When used, the tackifier preferably comprises about 0.1% or less to about 30% or greater, more preferably about 2% to about 25% and even more preferably about 6% to about 20% by weight of the activatable material. Advantageously, the tackifier may be able to assist in controlling cure rates for producing a more consistent or predictable expansion for the activatable material.

One or more blowing agents may be added to the activatable material for producing inert gasses that form, as desired, an open and/or closed cellular structure within the activatable material. In this manner, it may be possible to lower the density of articles fabricated from the material. In addition, the material expansion helps to improve sealing capability, substrate wetting ability, adhesion to a substrate, acoustic damping, combinations thereof or the like. The blowing agent may include one or more nitrogen containing groups such as amides, amines and the like. Examples of suitable blowing agents include azodicarbonamide, dinitrosopentamethylenetetramine, 4,4$_t$-oxy-bis-(benzenesulphonylhydrazide), trihydrazinotriazine and N, N$_t$-dimethyl-N,N$_t$-dinitrosoterephthalamide.

An accelerator for the blowing agents may also be provided in the activatable material. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified and unmodified thiazoles or imidazoles, ureas or the like. Amounts of blowing agents and blowing agent accelerators can vary widely within the activatable material depending upon the type of cellular structure desired, the desired amount of expansion of the activatable material, the desired rate of expansion and the like. Exemplary ranges for the amounts of blowing agents, blowing agent accelerators or both together in the activatable material range from about 0.1% by weight to about 25%, more preferably about 2% to about 20% and even more preferably about 7% to about 15% by weight of the activatable material.

In one embodiment, the present invention contemplates the omission of a blowing agent. Thus, it is possible that the material will not be an activatable material. Preferably, the formulation of the present invention is thermally activated. However, other agents may be employed for realizing activation by other means, such as moisture, radiation, or otherwise.

One or more curing agents and/or curing agent accelerators may be added to the activatable material. Amounts of curing agents and curing agent accelerators can, like the blowing agents, vary widely within the activatable material depending upon the type of cellular structure desired, the desired amount of expansion of the activatable material, the desired rate of expansion, the desired structural properties of the activatable material and the like. Exemplary ranges for effective amounts of the curing agents, curing agent accelerators of both together present in the activatable material range from about 0% by weight to about 7% by weight.

Preferably, the curing agents assist the activatable material in curing by crosslinking of the polymers, epoxy resins (e.g., by reacting in stoichiometrically excess amounts of curing agent with the epoxide groups on the resins) or both. It is also possible that the curing agents assist in thermosetting the activatable material. Useful classes of curing agents are materials selected from aliphatic or aromatic amines or their respective adducts, am idoamines, polyamides, cycloaliphatic amines, (e.g., anhydrides, polycarboxylic polyesters, isocyanates, phenol-based resins (such as phenol or cresol novolak resins, copolymers such as those of phenol terpene, polyvinyl phenol, or bisphenol-A formaldehyde copolymers, bishydroxyphenyl alkanes or the like), peroxides or mixtures thereof. Particular preferred curing agents include modified and unmodified polyamines or polyamides such as triethylenetetramine, diethylenetriamine tetraethylenepentamine, cyanoguanidine, dicyandiamides and the like. An accelerator for the curing agents (e.g., a modified or unmodified urea such as methylene diphenyl bis urea, an imidazole or a combination thereof) may also be provided for preparing the activatable material.

Though longer curing times are also possible, curing times of less than 5 minutes, and even less than 30 seconds are possible for the formulation of the present invention. Moreover, such curing times can depend upon whether additional energy (e.g., heat, light, radiation) is applied to the material or whether the material is cured at room temperature.

The activatable material may also include one or more fillers or reinforcing components, including but not limited to particulated materials (e.g., powder), beads, microspheres, nanoparticles or the like. Preferably the filler or reinforcing component includes a relatively low-density material that is generally non-reactive with the other components present in the activatable material. Examples of fillers and reinforcing components include silica, diatomaceous earth, glass, clay, talc, pigments, colorants, glass beads or bubbles, glass, carbon ceramic fibers, antioxidants, and the like. Such materials, particularly clays, can assist the activatable material in leveling itself during flow of the material. The clays that may be used as reinforcing components may include nanoparticles of clay and/or clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed. One or more mineral or stone type fillers such as calcium carbonate, sodium carbonate or the like may be used as fillers. Silicate minerals such as mica may be used as fillers. It is possible that silicate minerals and mica in particular may improve the impact resistance of the cured activatable material. When employed, the fillers or reinforcing components in the activatable material can range from 1% to 90% by weight of the activatable material. According to some embodiments, the activatable material may include from about 3% to about 30% by weight, and more preferably about 10% to about 20% by weight clays or similar fillers.

It is contemplated that one of the fillers or other components of the material may be thixotropic for assisting in controlling the viscosity and thus the flow of the material as well as properties such as tensile, compressive or shear strength in its green state, during activation and post-cure.

Other additives, agents or performance modifiers may also be included in the activatable material as desired, including but not limited to a UV resistant agent, a flame retardant, an impact modifier, a heat stabilizer, a UV photoinitiator, a colorant, a processing aid, an anti-oxidant, a lubricant, a coagent, a reinforcement (e.g., chopped or continuous glass, glass fiber, ceramics and ceramic fibers, aramid fibers, aramid pulp, carbon fiber, acrylate fiber, polyamide fiber, polypropylene fibers, combinations thereof or the like). In one preferred embodiment, for example, an acrylate coagent may be employed for enhancing cure density. It is also contemplated that the activatable material may include about 0.10 to about 5.00 weight percent of an anti-oxidant such as a propionate (e.g., pentaerythritol tetrakis (3-(3,5-di-tert-butyl-4-hydroxyphenyl) propionate)) for assisting in controlling oxidation, cure rate or both.

When determining appropriate components for the activatable material, it may be important to form the material such that it will only activate (e.g., flow, foam or otherwise change states) at appropriate times or temperatures. For instance, in most applications, it is undesirable for the material to be reactive at room temperature or otherwise at the ambient temperature in a production environment, unless the activation mechanism is by way of a two-part material or other chemical activation. More typically, the activatable material becomes activated to flow at higher processing temperatures. As an example, temperatures such as those encountered in an automobile assembly plant may be appropriate, especially when the activatable material is processed along with the other components at elevated temperatures or at higher applied energy levels, e.g., during painting preparation steps. Temperatures encountered in many coating operations (e.g., in a paint curing oven), for instance, range up to about 180° C. or higher, 200° C. or higher, 250° C. or higher.

For mixing the additives, fillers or both, it may be preferable for the additives or fillers to be mixed with a dispersant prior to mixing them with the other ingredients of the activatable material. Such a dispersant will typically have a relatively low molecular weight of less than about 100,000 amu, more preferably less than about 50,000 amu and still more preferably less than about 10,000 amu, although not required. Examples of such dispersants include, without limitation, liquid waxes, liquid elastomers or the like such as ethylene-propylene rubber (EPDM), paraffins (e.g., paraffin wax).

When the material is activatable, it is possible to make a family of materials according to the present invention wherein the members of the family have different expansion levels. Such a family is, at least in part, may be formed by varying the amount of blowing agent, blowing agent accelerator or both. For exemplary purposes, table A is provided below for showing amounts of blowing agents and/or blowing agent accelerators for one particular family that may be formed according to the present invention along with exemplary levels of expansion for materials in the family.

TABLE A

| Weight Percent of Blowing Agent, Blowing Agent Accelerator or Both | Percent Volume of Expanded Material as Compared to Non-Expanded Material |
| --- | --- |
| Up to 1.5% or 2.0% or greater | Up to About 300% to about 400% or greater |
| Up to 3.0% or 3.5% or greater | Up to About 700% to about 800% or greater |
| Up to 5.0% or 5.5% or greater | Up to About 1150% to about 1250% or greater |
| Up to 7.0% or 8% or greater | Up to About 1550% to about 1750% or greater |

9

10

TABLE A-continued

| Weight Percent of Blowing Agent, Blowing Agent Accelerator or Both | Percent Volume of Expanded Material as Compared to Non-Expanded Material |
| --- | --- |
| Up to 9.0% or 10% or greater | Up to About 2100% to about 2250% or greater |
| Up to 13% or 14% or greater | Up to About 2900% to about 3000% or greater |

In the event that the coated device described herein is a fastening device, such fastening device may be used to mechanically fix (e.g., secure) two or more structures, body panels, frame rails, and the like. The fastening device may include a threaded surface. The threaded surface may be on the exterior surface of the fastening device. The threaded surface may be on the interior surface of the fastening device. A threaded surface may be presented on both the interior surface and exterior surface of the fastening device. The fastening device may be free of a threaded surface. The fastening device may be a bolt, a nut, a weld nut, a screw, a clamp, a flange, a grommet, a rivet, a retaining pin, a peg, or a nail. The fastening device may be a tree-fastener. The fastening device may be any conventional fastener understood in the art.

The device may be a reinforcing structure. The reinforcing structure may be formed of a carrier. The carrier may be elongated and may include a longitudinal axis. The carrier may have a substantially constant cross-section. Alternatively, the cross section may vary along an axis. The surface of the carrier may be substantially flat. The surface may alternatively include one or more structures that may be formed as rib structures which may be arranged parallel and/or perpendicular to the longitudinal axis of the carrier. The reinforcing structure may be a unitary structure or may include multiple structures having a means for connecting to one another. The particulated coating of activatable material may thus be located onto one or more surfaces of the reinforcing structure.

The device may include a baffle structure. The baffle structure may include a central portion and a rim portion. The central portion may be substantially flat. The central portion may have on or more curved or undulating surfaces. The central portion may be substantially circumscribed by the rim portion. The rim portion may extend around only a portion of the central portion. The baffle structure may extend into to substantially fill a cross section of a cavity. Thus, the particulated coating of activatable material may be located onto one or more surfaces of the baffle structure so that the cross section of the cavity is completely filled upon expansion of the activatable material.

The devices described herein may be formed from conventional materials including, but not limited to metallic materials, polymeric materials, or some combination thereof. The devices may comprise aluminum, aluminum alloy, carbon steel, alloy steel, stainless steel, iron, brass, bronze, titanium, titanium alloy, magnesium, or a combination thereof. The device may include steel or aluminum.

The device may include various types of conventional plating materials including but not limited to, zinc, chromium, chrome, nickel, cadmium, magnesium, phosphate, or a combination thereof. The device may be free of plating materials such that the device is bare. Preferably, the device is coated with a conventional plating material to prevent corrosion. The activatable material may be placed onto or immediately adjacent to the plating material located on the device.

The activatable material is used to coat at least a portion of the device. The activatable material may coat the entire device. The activatable material may coat multiple portions of the device. The activatable material may coat one or more surfaces of the device. The activatable material may coat all or a portion of a threaded surface of the device. The activatable material may coat a nonthreaded area of the device. For example, the activatable material may be located on the top and bottom surfaces of a weld nut. The activatable material is located on the device such that upon activation, the activatable material will fill in the area between the device and the aperture or cavity on which the device is located for preventing fluids, gasses, debris and/or sound from passing through. The activatable material may coat the device in a uniform manner (e.g., it may have a substantially consistent coating thickness) or may have a coating thickness that varies. The activatable material, once coated onto the device, is generally dry to the touch and non-tacky. However, it is possible that the activatable material is tacky upon application to the device.

The device may be heated to a desired temperature to cause adherence of the activatable material to the device, while avoiding activation of the activatable material. The step of coating the device with particles of the activatable material may be such that the heat of the device partially melts the activatable material onto the heated surfaces of the device (while avoiding full activation of the activatable material). It is possible that the device is heated to a temperature to promote adhesion of the particles to the device but not hot enough to activate the activatable material.

The activatable material is generally a dry-to-touch, solid material in its green state, during activation and/or post-cure. The activatable material may be a tacky material in its green state, during activation, or post cure. It is possible that the activatable material is prepared for coating the device by cryogenically freezing the activatable material. The activatable material is preferably in the form of pellets before being subjected to freezing conditions. The activatable material pellets may be frozen (or cryogenically frozen) and then fragmented, shredded, ground, milled or a combination thereof. The activatable material is frozen so that the activatable material is more brittle and more easily converted into a fine particulate. For example, when the activatable material is immersed in a cryogenic fluid, the temperature is sufficiently low so that it reduces the ability of the material to resist a high mechanical stress, so that when the material is being milled to a particular size, the material is more brittle and is easier to reduce to smaller particles without significant force. It is contemplated that the cryogenic fluid used to freeze the activatable material may be, but not limited to, liquid nitrogen, liquid neon, liquid hydrogen, liquid helium, or any other cryogenic fluid commonly known in the art. The activatable material may be cooled to a temperature between $-180°$ C. and $-273°$ C. Once the frozen activatable material has been milled, the activatable material is further ground down to a particle size of from about 10 microns to about 500,000 microns. The particle size of the milled activatable material may be at least about 500 microns. The particle size of the milled activatable material may be less than about 100,000 microns. The particle size of the milled activatable material may be at least about 1000 microns. The particle size of the milled activatable material may be less than about 50,000 microns. The particle size of the milled activatable material may be at least about 5000 microns. The particle size of the milled activatable material may be less than about 10,000 microns. It is also possible that the activatable material is milled without a separate freezing step. The activatable material may be treated so that it is more easily milled or the activatable material may be milled directly from room temperature pellets. The activatable material is used to coat the device, or at least a portion of the device (e.g., that which enters an aperture or cavity during use).

The activatable material may be milled in multiple steps. For example, the activatable material may be milled to a first average particle size and then to a second smaller average particle size. It is possible that consistency in average particle size may improve one or more of the expansion consistency, coating thickness, or adhesion ability of the milled activatable material.

To coat the device with the activatable material, the device is heated to a temperature which is lower than the activation temperature of the activatable material but elevated enough to cause the activatable material particulate to adhere. The heated device may be dipped, sprayed, immersed, or any other form of coating practice commonly known in the art with the activatable material particulate. The process of coating the device with the activatable material may be free of any molding or extrusion steps that are typically used to apply activatable material to the device described herein. The activatable material particulate adheres to the device through a heat bond, although other types of bonding relationships may be utilized. Once the activatable material particulate is adhered to the device, the coated device is cooled and stored until use.

The device coated with the activatable material may be utilized in a variety of applications to join elements, seal cavities, and/or reinforce cavities. The coated device may join at least one element with one or more additional elements. The coated device may be adjacent to, pass through, or a combination thereof the one or more elements which the device is used to join. For example, a bolt or a screw may pass through an element. For example, a weld nut may be adjacent to the element. The coated device, when installed, may leave space between the aperture through which it passes and part of the device for subsequent coatings to be applied. The coated device may be located into a single cavity or may be located into multiple cavities that are connected via an opening. The device may be coated first and then located into a cavity or aperture. The device may be first located into an aperture or cavity and then coated after location. The coating process may allow for simplified application of activatable adhesives during installation. Typically, adhesives are applied to parts, the parts are possibly stored, then shipped, and then installed and activated. Depending on the amount of time spent in storage, the behavior of the adhesive (e.g., expansion rate, adhesion or the like) can change over time based on its shelf life. If the adhesive can be coated onto a device during installation, the shelf life of the activatable material in its green (e.g., unexpanded) state is no longer a concern.

The coated device, when used to join (e.g., connect or adjoin) elements or fill cavities allows for subsequent coatings to be applied to the fastened elements or cavities such that the additional coatings may enter into the aperture or cavity when the coated device is present, but the activatable material is not activated. It is contemplated that the subsequent coating may be used to prevent corrosion. For example, the article which the device is used on may be subjected to an electrocoating process. Because the coated device does not activate and expand until a preselected condition is met, such as baking to a predetermined temperature, the one or more subsequent coatings may be applied prior to activation of the activatable material. The one or more subsequent coatings may penetrate into an aperture, coating the surfaces of aperture. Once the condition for activation and expansion is met, the activatable material located on the device will expand and adhere to the aperture which the device is disposed in or on, preventing fluids or gases from passing into and through post activation. The activated coated device will seal the aperture between the one or more elements which the device connects.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for ail purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. An activatable material coated device comprising:
a) a device for fastening, baffling, sealing, or reinforcing;
b) an activatable material, comprising:
   i) at least about 5.5% or greater of a blowing agent, a blowing agent accelerator, or both;
   ii) a curing agent;
   iii) one or more fillers or reinforcing components; and
   iv) one or more components comprising an acetate, a methacrylate, or a combination thereof;
wherein the activatable material is dry to the touch prior to activation and located into direct contact with the device for fastening, baffling, sealing, or reinforcing prior to activation and is milled into an initial particulate size of at least 10 microns and at most 500 microns;
wherein the activatable material is a frozen material prior to being milled;
wherein the activatable material is adapted to be activated to expand to a thickness of from about 1 mm to about 10 mm greater than an initial thickness and adhere at temperatures of at least 180° C.; and
wherein the device is heated to a temperature of at least about 30° C. but below an activation temperature of the activatable material and contacted with the particulate of the activatable material, so that the particulate activatable material softens and adheres to the device.

2. The activatable material coated device of claim 1, wherein the activatable material further comprises a dispersant;
wherein the molecular weight of the dispersant is less than about 50,000 amu; and
wherein the dispersant is selected from a paraffin wax or an ethylene propylene diene monomer.

3. The activatable material coated device of claim 1, wherein upon exposure to an elevated temperature, the activatable material expands to at least 100%, at least 500%, at least 1000% or even at least 3000% of its original size.

4. The activatable material coated device of claim 3, wherein the one or more fillers or reinforcing components includes one or more of calcium carbonate, aramid pulp, or any combination thereof.

5. The activatable material coated device of claim 3, wherein the activatable material is in a pellet form prior to being milled.

6. The activatable material coated device of claim 1, wherein the activatable material includes about 10% to about 70% by weight of a polymeric admixture;
wherein the polymeric admixture includes one or more acrylates and one or more acetates;
wherein the polymeric admixture is at least about 40% of the activatable material and the one or more acrylates comprise about 40% to about 85% of the polymeric admixture and the one or more acetates comprise about 7% to about 35% of the polymeric admixture.

7. The activatable material coated device of claim 6, wherein the polymeric admixture includes about 6.0% to about 20% of a tackifier, the tackifier being a hydrocarbon resin, and about 0.1% to about 10% by weight of an epoxy resin.

8. The activatable material coated device of claim 7, wherein the activatable material includes 8% or greater of the blowing agent and the blowing agent accelerator, the blowing agent being selected from an amine or an amide and the blowing agent accelerator being selected from a metal salt or an oxide.

9. The activatable material coated device of claim 1, wherein upon exposure to an elevated temperature greater than about 180° C., the activatable material expands to a volume that is at least 2000% greater than the volume of the activatable material in an unexpanded state.

10. The activatable material coated device of claim 9, wherein the activatable material is first pelletized and frozen thereafter.

11. The activatable material coated device of claim 1, wherein the curing agent has an activation temperature between about 60° C. and about 110° C.

12. The activatable material coated device of claim 1, wherein the activatable material is in a pellet form prior to being milled.

13. The activatable material coated device of claim 1, wherein the device for fastening, baffling, sealing, or reinforcing is a carrier of a reinforcing structure.

14. The activatable material coated device of claim 13, wherein the carrier includes a plurality of rib structures and the activatable material is located onto a portion of the plurality of rib structures.

15. The activatable material coated device of claim 1, wherein the device for fastening, baffling, sealing, or reinforcing is a baffle structure.

16. The activatable material coated device of claim 15, wherein the baffle structure incudes a central portion and rim portion.

17. The activatable material coated device of claim 16, wherein the activatable material is located onto the rim portion.

18. The activatable material coated device of claim 17, wherein the central portion is substantially circumscribed by the rim portion.

19. The activatable material coated device of claim 16, wherein the activatable material is located onto the central portion.

* * * * *